(12) United States Patent
Li et al.

(10) Patent No.: US 9,047,008 B2
(45) Date of Patent: Jun. 2, 2015

(54) METHODS, APPARATUSES, AND COMPUTER PROGRAM PRODUCTS FOR DETERMINATION OF THE DIGIT BEING USED BY A USER TO PROVIDE INPUT

(75) Inventors: Frank Chun Yat Li, Richmond Hill (CA); David Dearman, San Bruno, CA (US)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 13/594,406

(22) Filed: Aug. 24, 2012

(65) Prior Publication Data

US 2014/0055371 A1    Feb. 27, 2014

(51) Int. Cl.
*G06F 3/041*    (2006.01)
*G06F 3/0488*    (2013.01)

(52) U.S. Cl.
CPC .................................. *G06F 3/04883* (2013.01)

(58) Field of Classification Search
CPC ............................. G06F 3/041; G06F 3/04883
USPC ................................................. 345/173–178
See application file for complete search history.

(56) References Cited

U.S. PATENT DOCUMENTS

| 7,812,828 B2 * | 10/2010 | Westerman et al. ........ 345/173 |
| 7,900,156 B2 * | 3/2011 | Andre et al. ................ 715/773 |
| 2009/0109187 A1 * | 4/2009 | Noma .......................... 345/173 |
| 2009/0295743 A1 * | 12/2009 | Nakajoh ...................... 345/173 |
| 2010/0097331 A1 | 4/2010 | Wu |
| 2010/0310136 A1 | 12/2010 | Tsuda |
| 2011/0163989 A1 | 7/2011 | Singhal |
| 2012/0030624 A1 | 2/2012 | Migos |
| 2012/0032979 A1 | 2/2012 | Blow et al. |

FOREIGN PATENT DOCUMENTS

| EP | 2 339 442 A2 | 6/2011 |
| EP | 2 541 385 A2 | 1/2013 |
| EP | 2 637 086 A1 | 9/2013 |

OTHER PUBLICATIONS

International Search Report and Written Opinion for Application No. PCT/FI2013/050807; dated Dec. 17, 2013.
Roudaut, et. al., http://www.youtube.com/watch?v=bfH0-OqgbLw; Microrolls: Expanding Touch-screen Input Vocabulary by Distinguishing Rolls Vs. Slides of the Thumb; dated Apr. 22, 2009.

* cited by examiner

*Primary Examiner* — Andrew Sasinowski
(74) *Attorney, Agent, or Firm* — Alston & Bird LLP

(57) ABSTRACT

Methods, apparatuses, and computer program products are herein provided for determination of the digit being used by a user to provide input. A method may include receiving user input defining a slide gesture from a digit of a user on a touchscreen. The method may further include determining a characteristic of the user input. The method may further include determining, based at least in part on the characteristic of the user input, the digit used by the user to provide the user input. In some cases, the method may further include causing modification of presentation of information on a display based on the digit determined to be used. Corresponding apparatuses and computer program products are also provided.

16 Claims, 23 Drawing Sheets

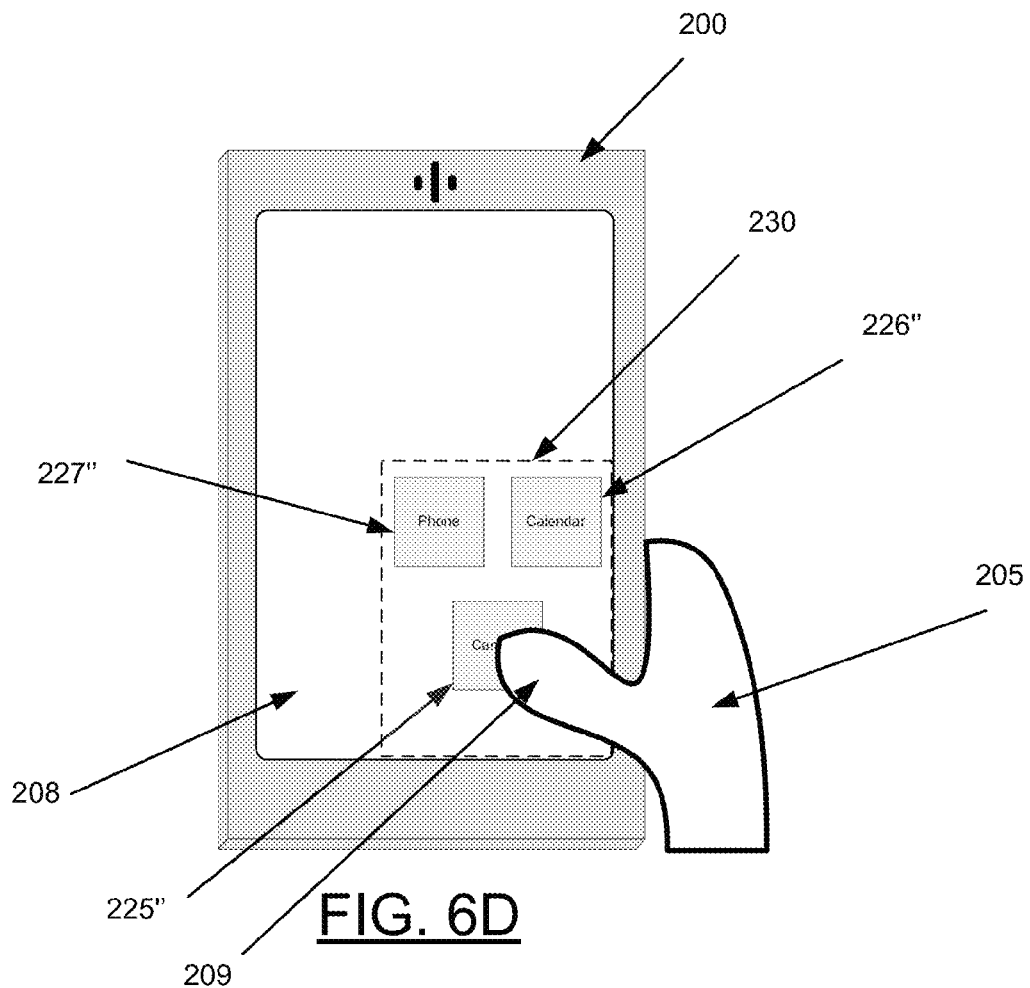

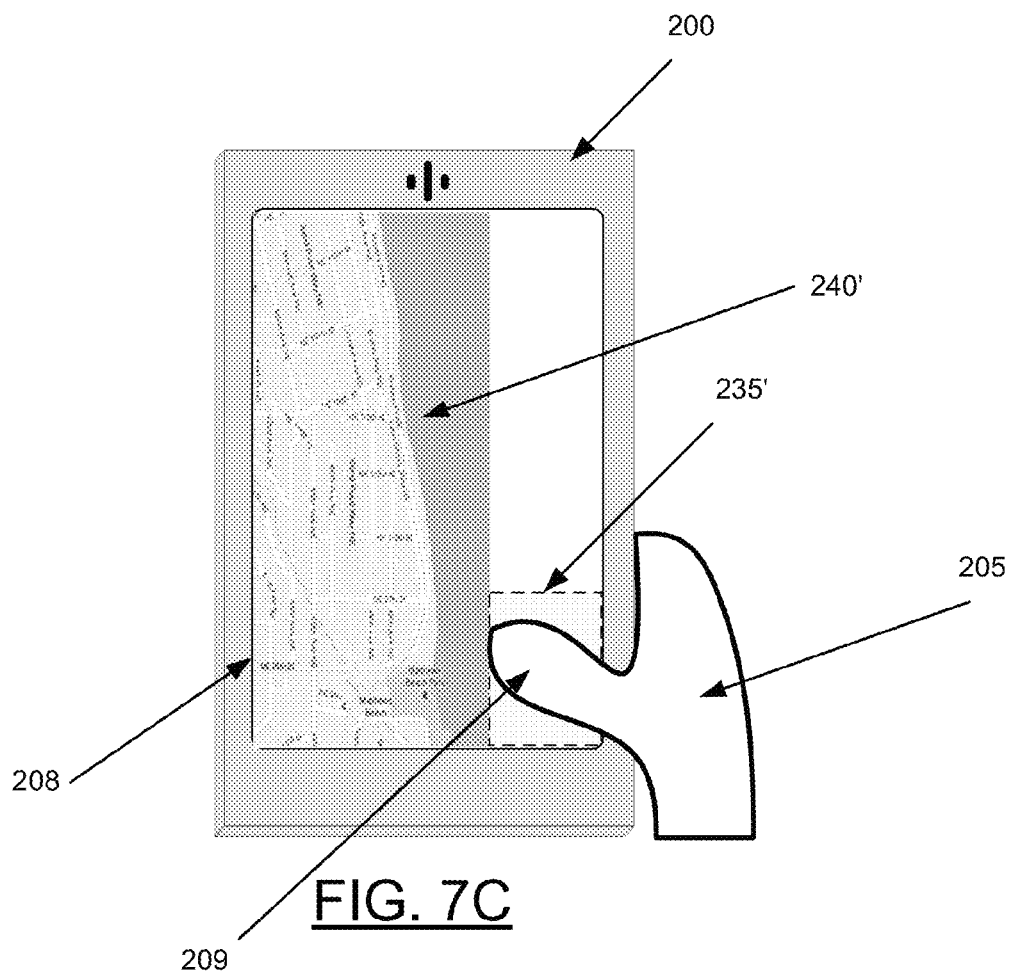

METHODS, APPARATUSES, AND COMPUTER PROGRAM PRODUCTS FOR DETERMINATION OF THE DIGIT BEING USED BY A USER TO PROVIDE INPUT

TECHNOLOGICAL FIELD

An example embodiment of the present invention relates generally to user interface technology and, more particularly, relates to methods, apparatuses, and computer program products for determination of the digit being used by a user to provide input.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Example embodiments of the present invention provide for determination of the digit being used by a user to provide input. In some embodiments, the presentation of information on the display may be modified based on the digit being used by the user to provide input. In such a manner, some embodiments provide a dynamic display that is adaptable to the finger or thumb being used by the user to provide input such that a more user-friendly and versatile display may be presented to the user.

In one example embodiment, a method includes receiving user input defining a slide gesture from a digit of a user on a touchscreen. The method further includes determining a characteristic of the user input. The method further includes determining, based at least in part on the characteristic of the user input, the digit used by the user to provide the user input.

In some embodiments, the method may include determining the digit by determining which of a right thumb, a left thumb, or another digit is used to perform the user input. In some embodiments, the method may include determining the digit used by the user to provide the user input by determining a length of the digit used to provide the user input. In some embodiments, the method may include determining the characteristic of the user input by determining a curvature of the user input. Additionally, in some embodiments, the method may include determining the characteristic of the user input by further determining at least one of a start point and an end point of the user input, a speed of the user input, a length of the user input, a radius of an elliptical representation of the user input, an orientation of the elliptical representation of the user input, or an area of the elliptical representation of the user input. In some embodiments, the method may include determining the characteristic of the user input by determining the characteristic based on output from at least one of an accelerometer, a gyroscope, or a pressure sensor.

In some embodiments, the method may further include causing modification of presentation of information on a display based on the digit determined to be used. In some embodiments, the method may further include defining, based at least in part on the characteristic of the user input, at least one of a size or a position of an input area. Additionally, the method may include causing modification of presentation of information by causing modification of presentation of information on the display such that the information is positioned within the input area. Additionally or alternatively, in some embodiments, the method may include causing modification of presentation of information by causing modification of presentation of information on the display such that the information is positioned outside of an area of the display obstructed by the digit determined to be used.

In some embodiments, the method may further include causing presentation of a keyboard on a display based on the digit determined to be used. A first keyboard may be presented in an instance in which a thumb is determined to be used. A second keyboard may be presented in an instance in which another digit is determined to be used.

In another example embodiment, an apparatus comprises at least one processor and at least one memory storing computer program code with the at least one memory and stored computer program code being configured, with the at least one processor, to cause the apparatus to receive user input defining a slide gesture from a digit of a user on a touchscreen. The at least one memory and stored computer program code are configured, with the at least one processor, to further cause the apparatus to determining a characteristic of the user input. The at least one memory and stored computer program code are configured, with the at least one processor, to further cause the apparatus to determine, based at least in part on the characteristic of the user input, the digit used by the user to provide the user input.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including receiving user input defining a slide gesture from a digit of a user on a touchscreen. The method further includes determining a characteristic of the user input. The method further includes determining, based at least in part on the characteristic of the user input, the digit used by the user to provide the user input.

In another example embodiment, an apparatus is provided. The apparatus comprises means for receiving user input defining a slide gesture from a digit of a user on a touchscreen. The apparatus further comprises means for determining a characteristic of the user input. The apparatus further comprises means for determining, based at least in part on the characteristic of the user input, the digit used by the user to provide the user input.

BRIEF DESCRIPTION OF THE DRAWINGS

Figure 1:
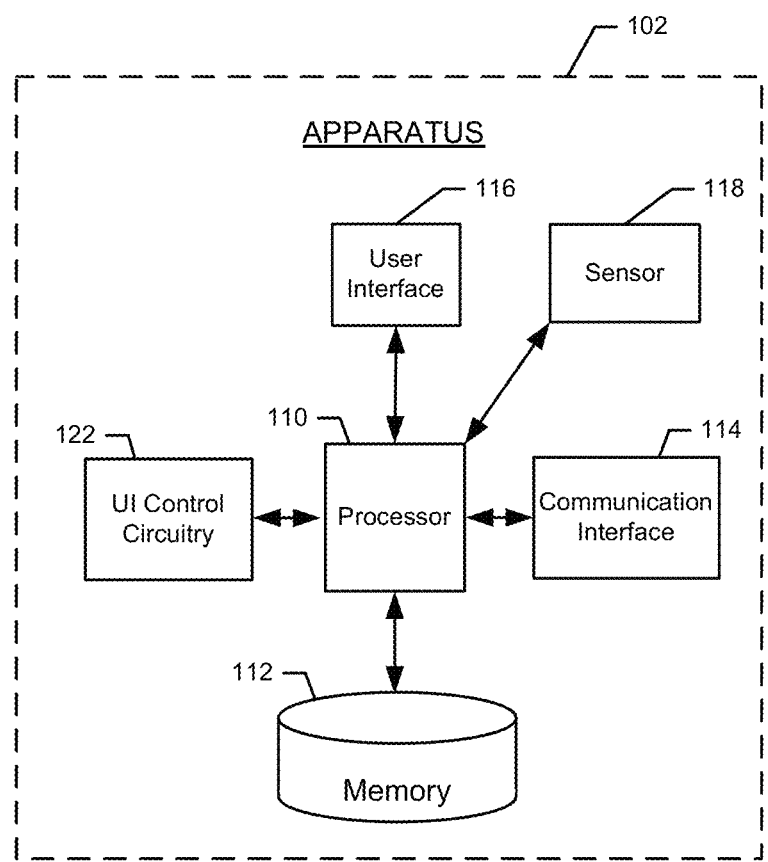
Figure 2:
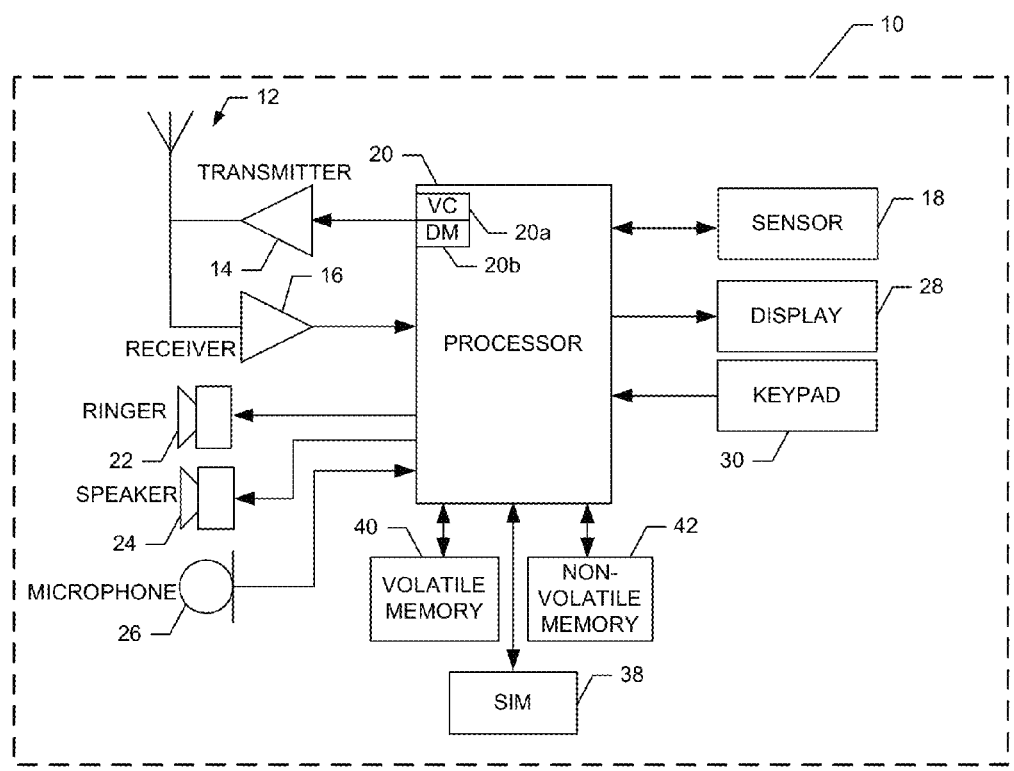
Figure 3A:
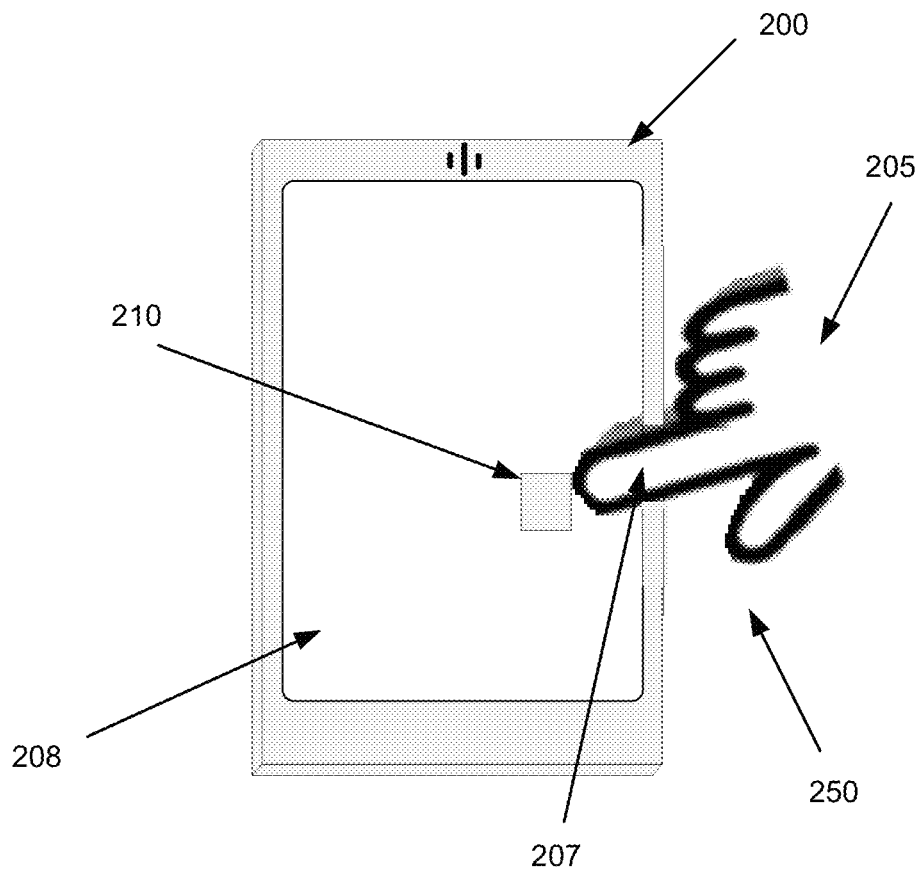
Figure 3B:
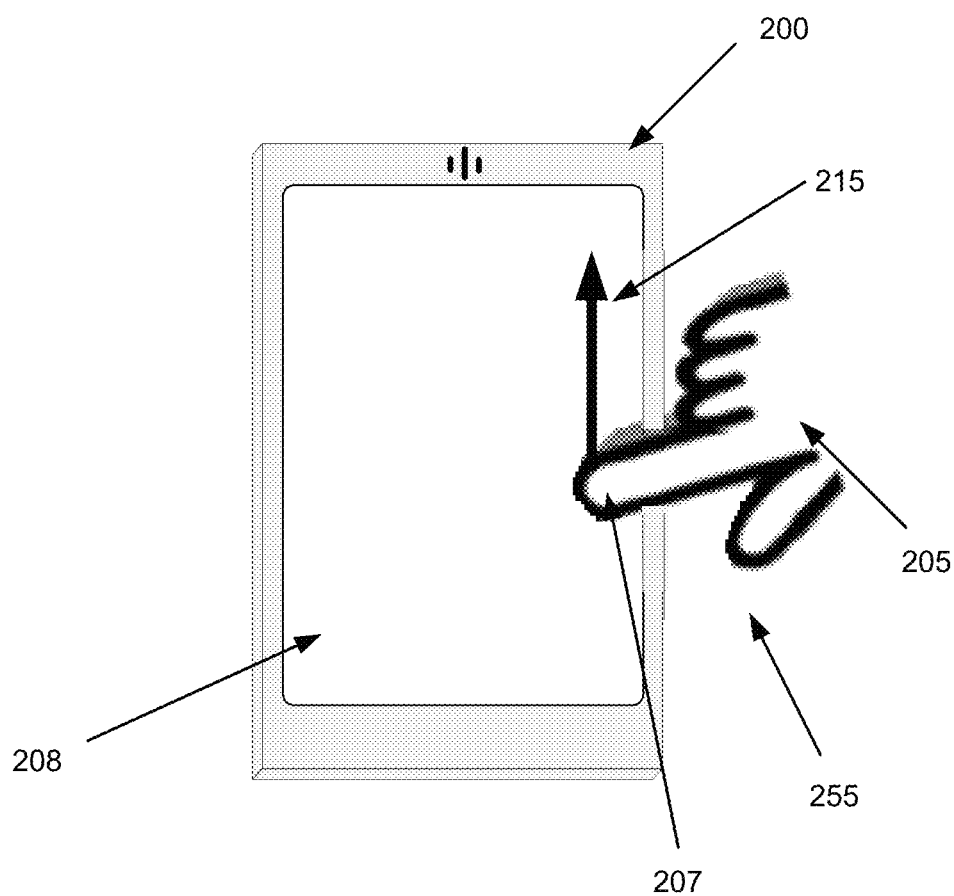
Figure 4A:
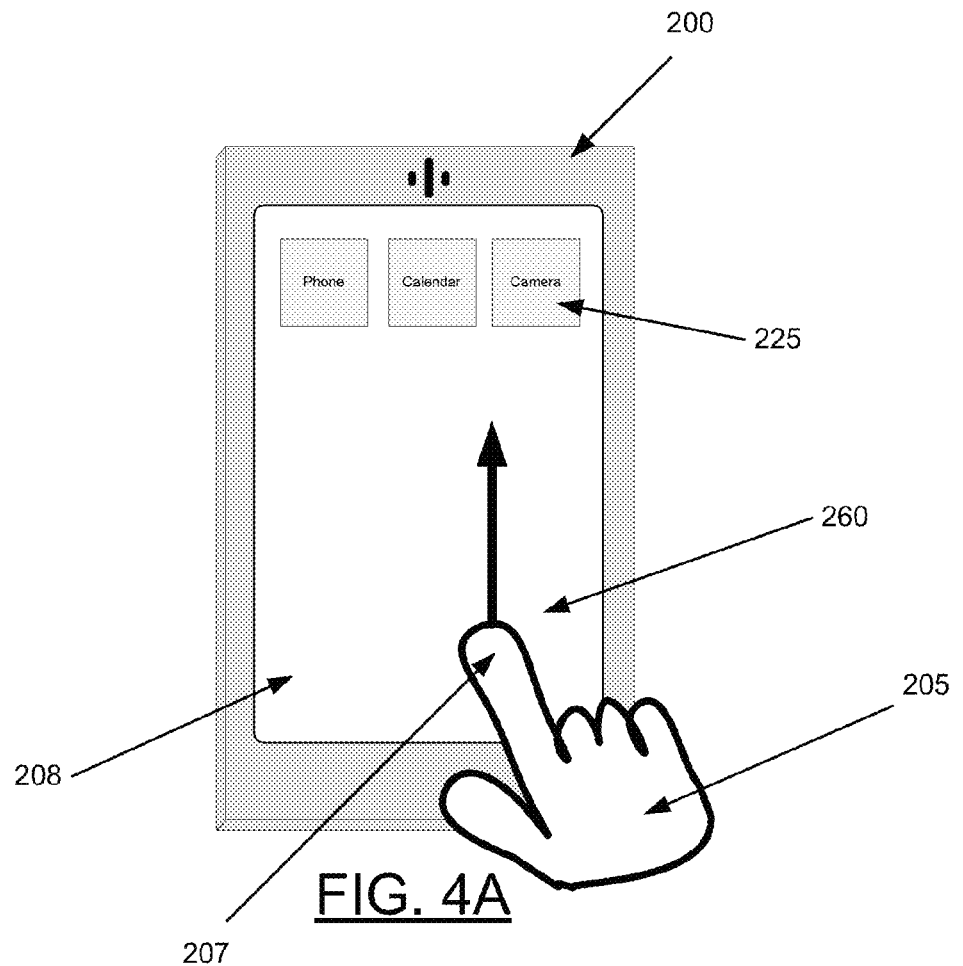
Figure 4B:
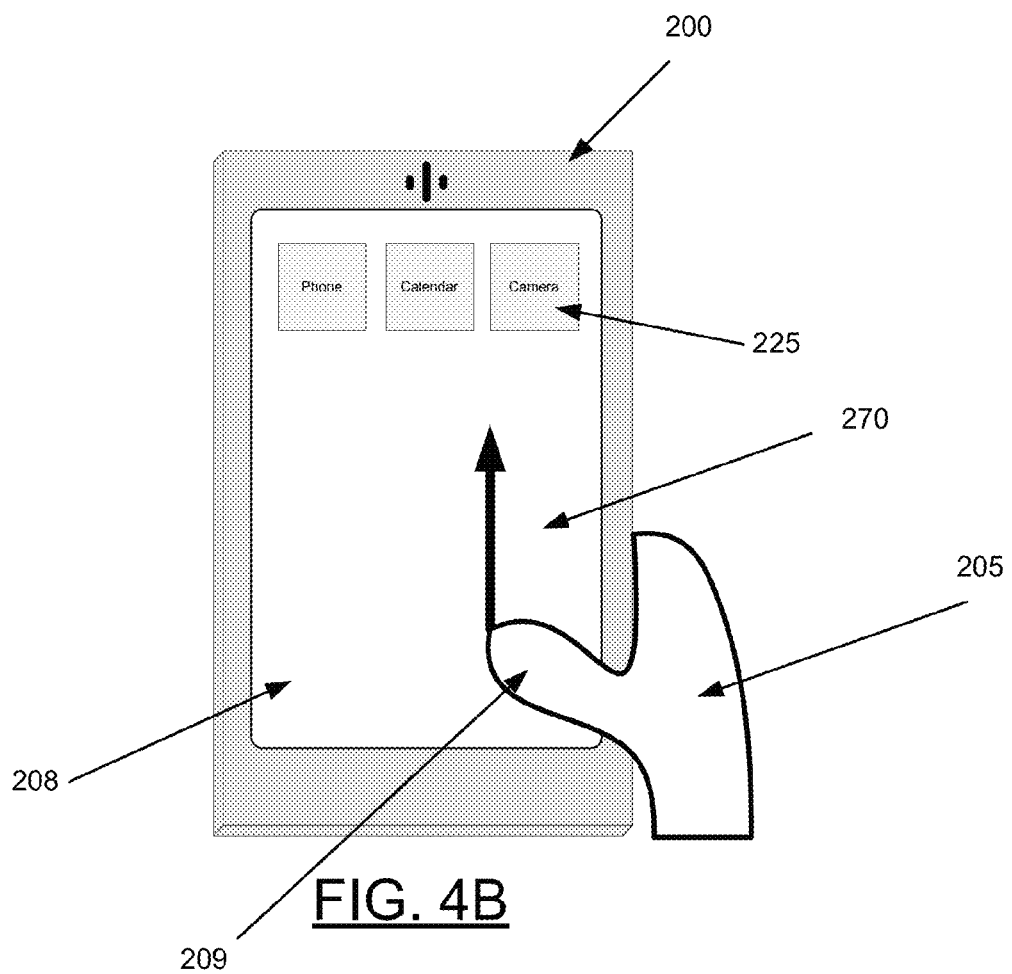
Figure 4C:
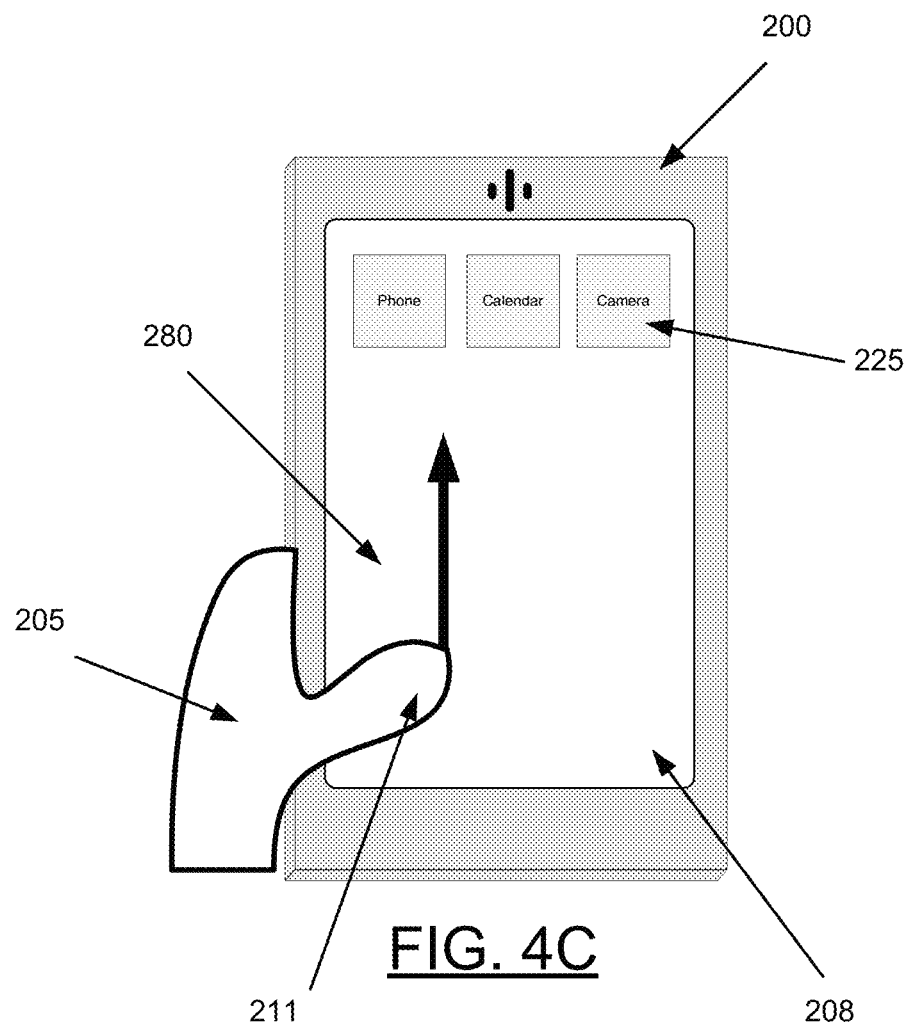
Figure 5A:
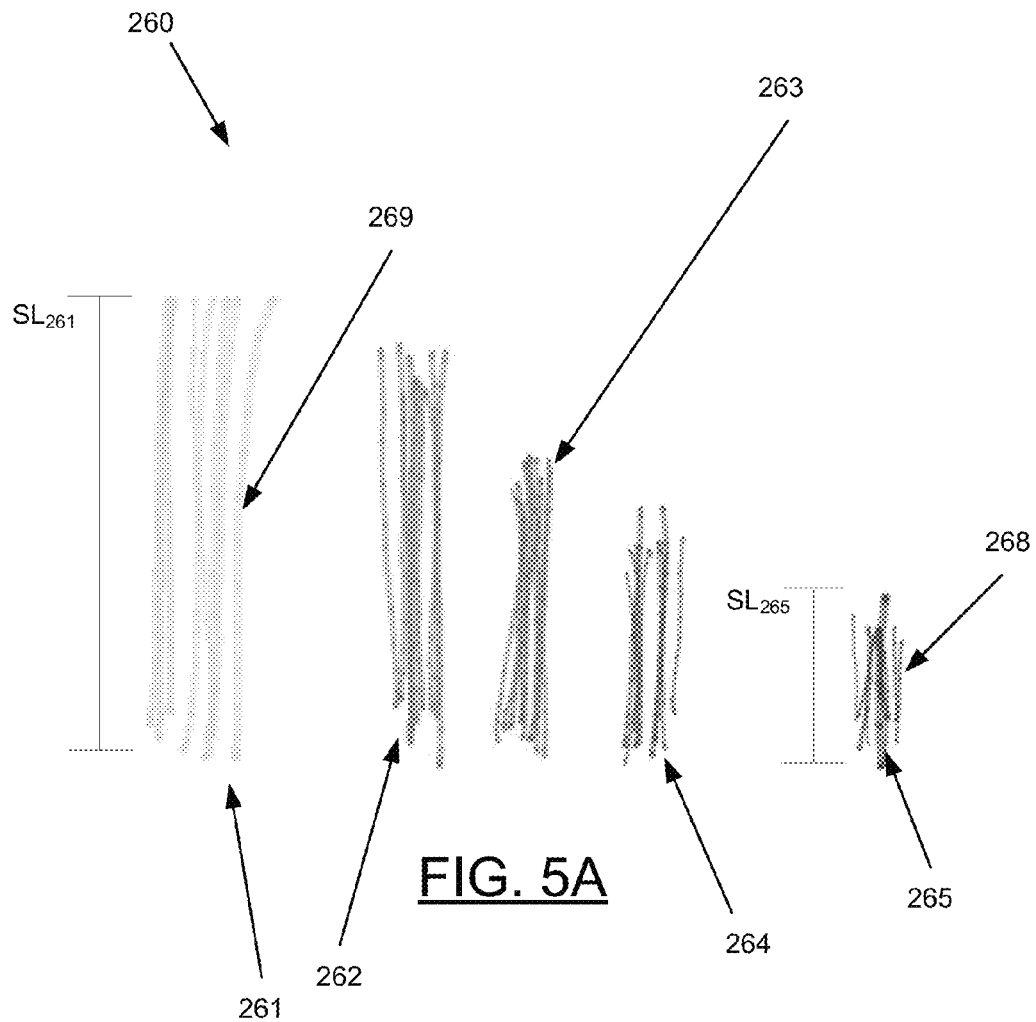
Figure 5B:
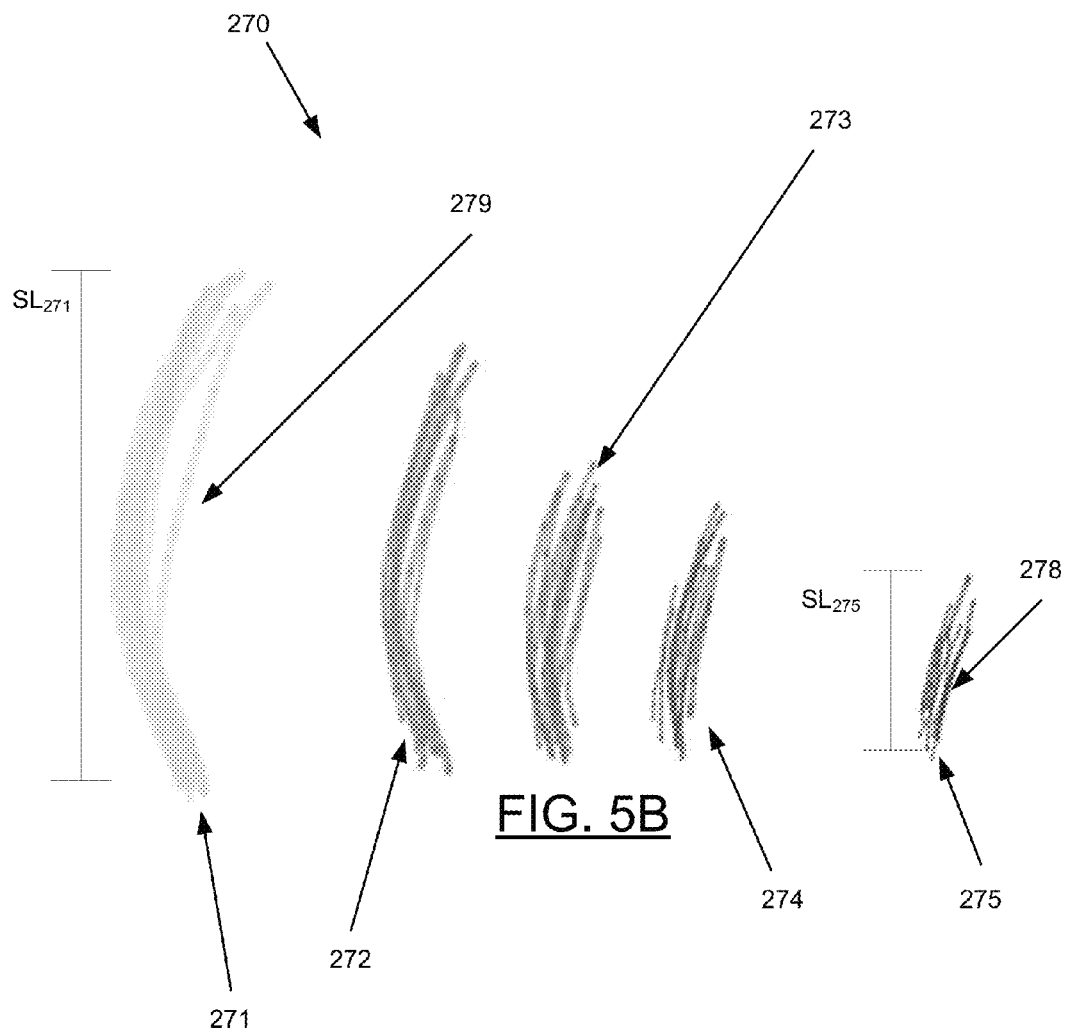
Figure 5C:
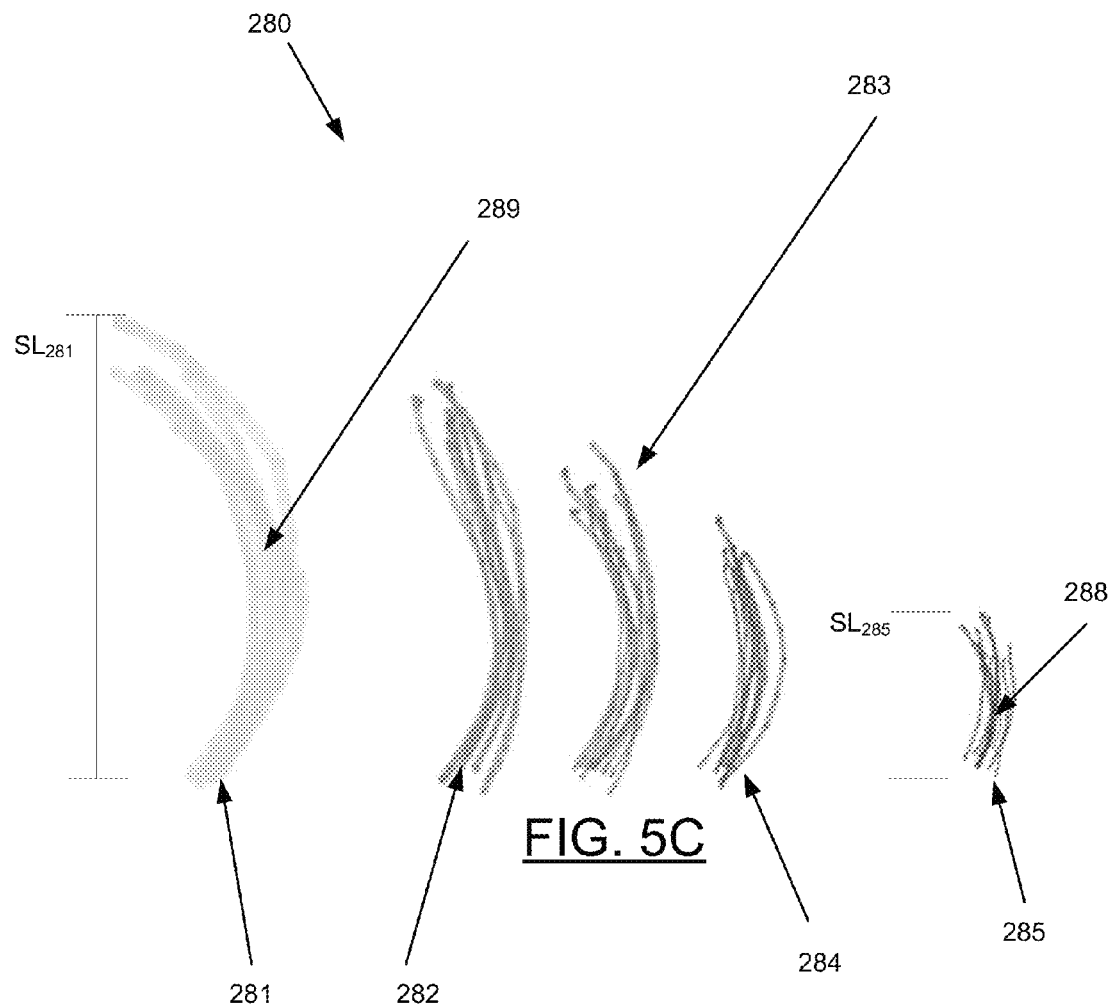
Figure 6A:
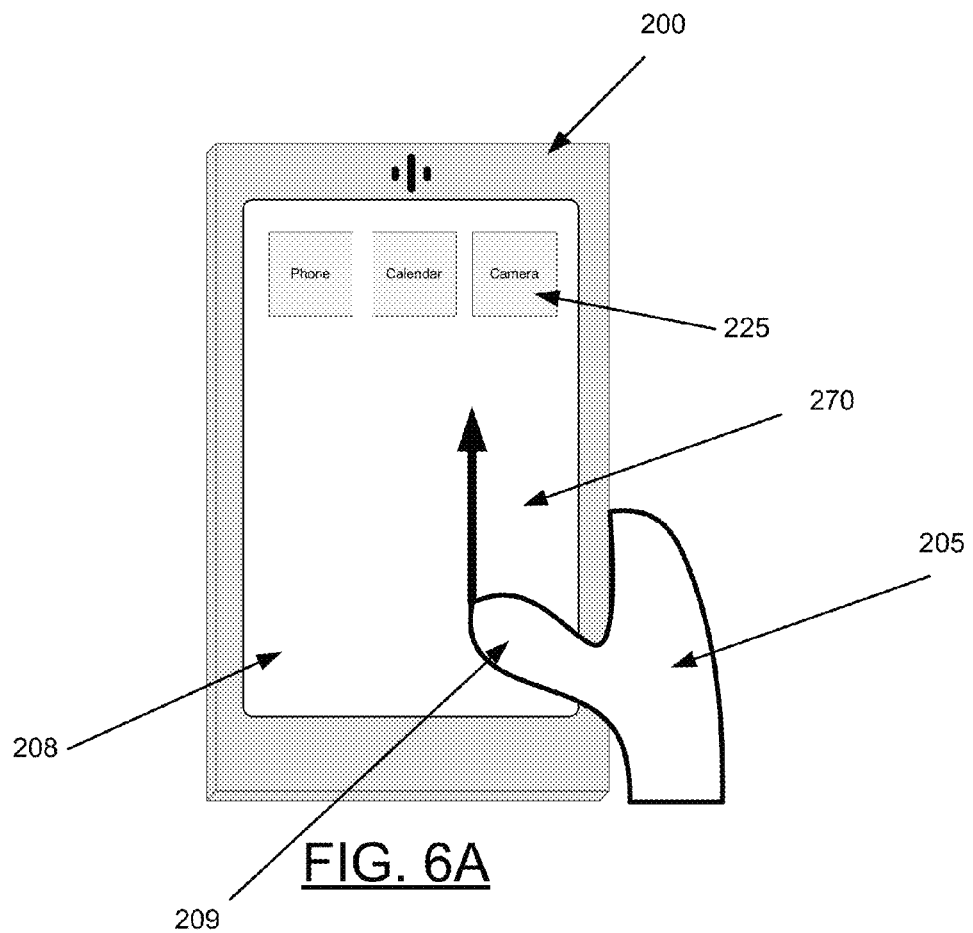
Figure 6B:
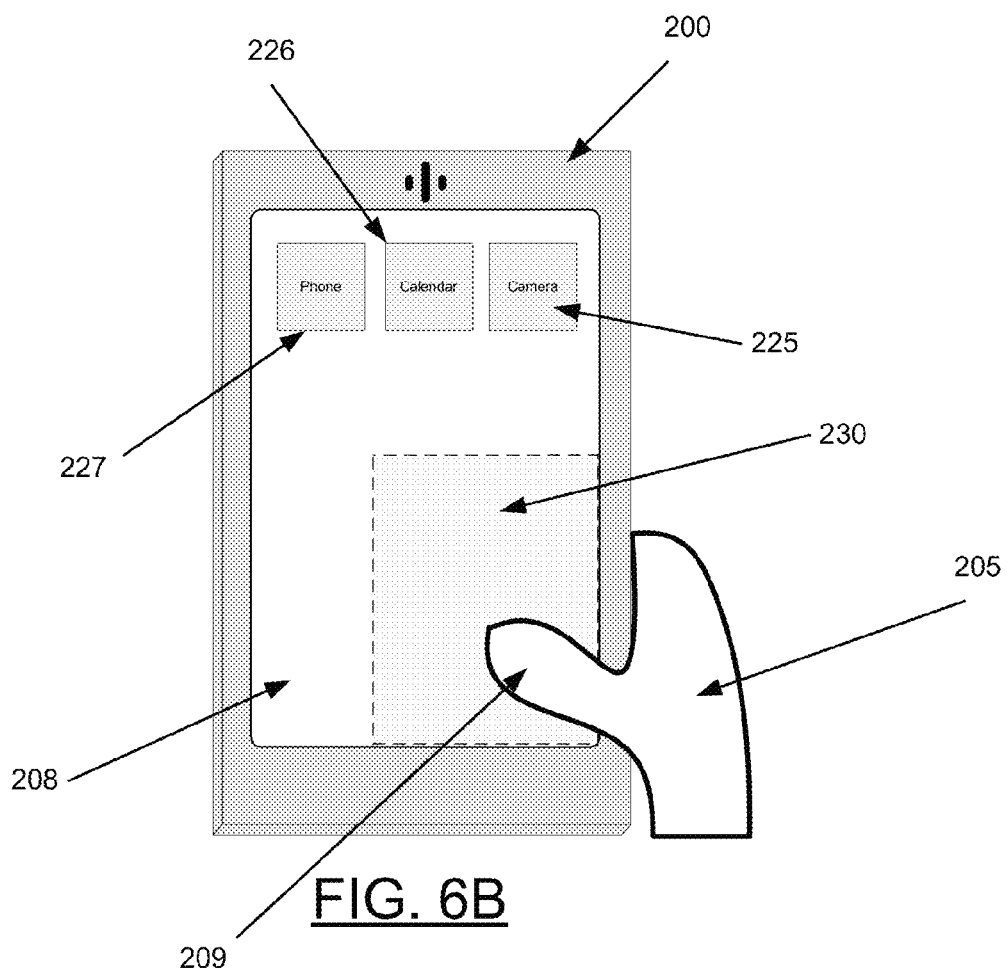
Figure 6C:
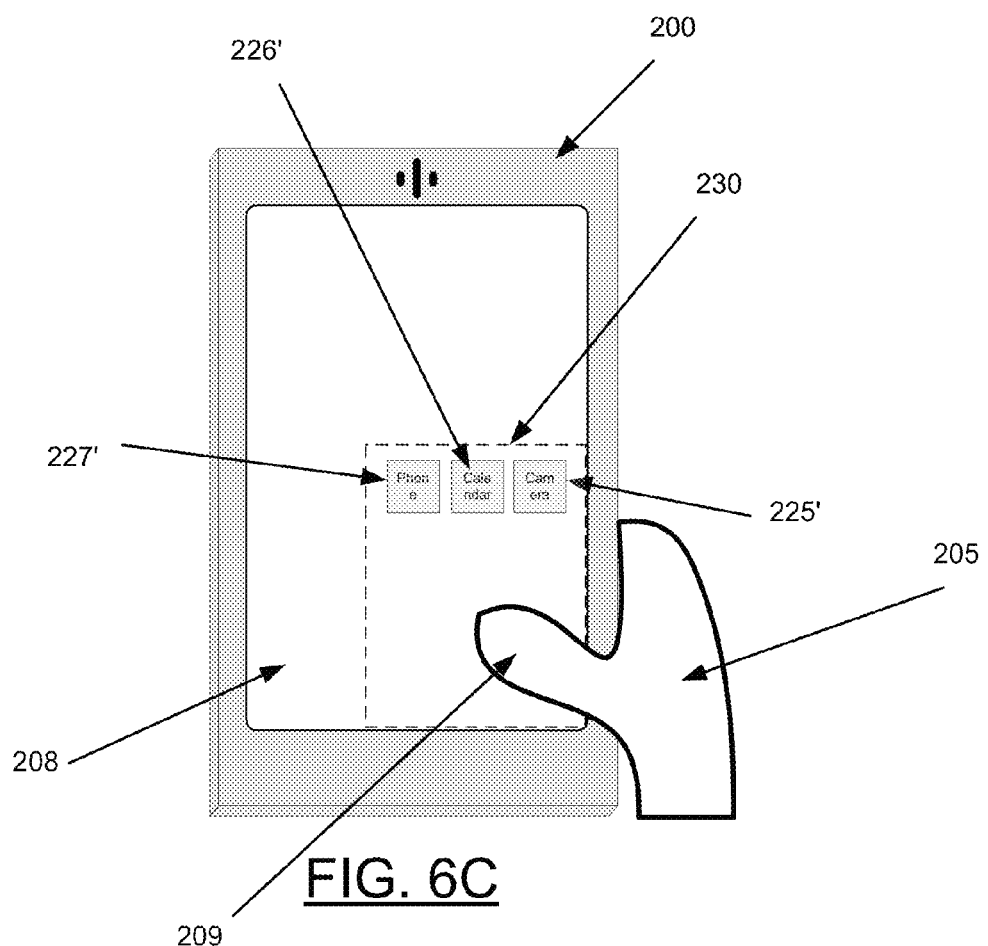
Figure 7A:
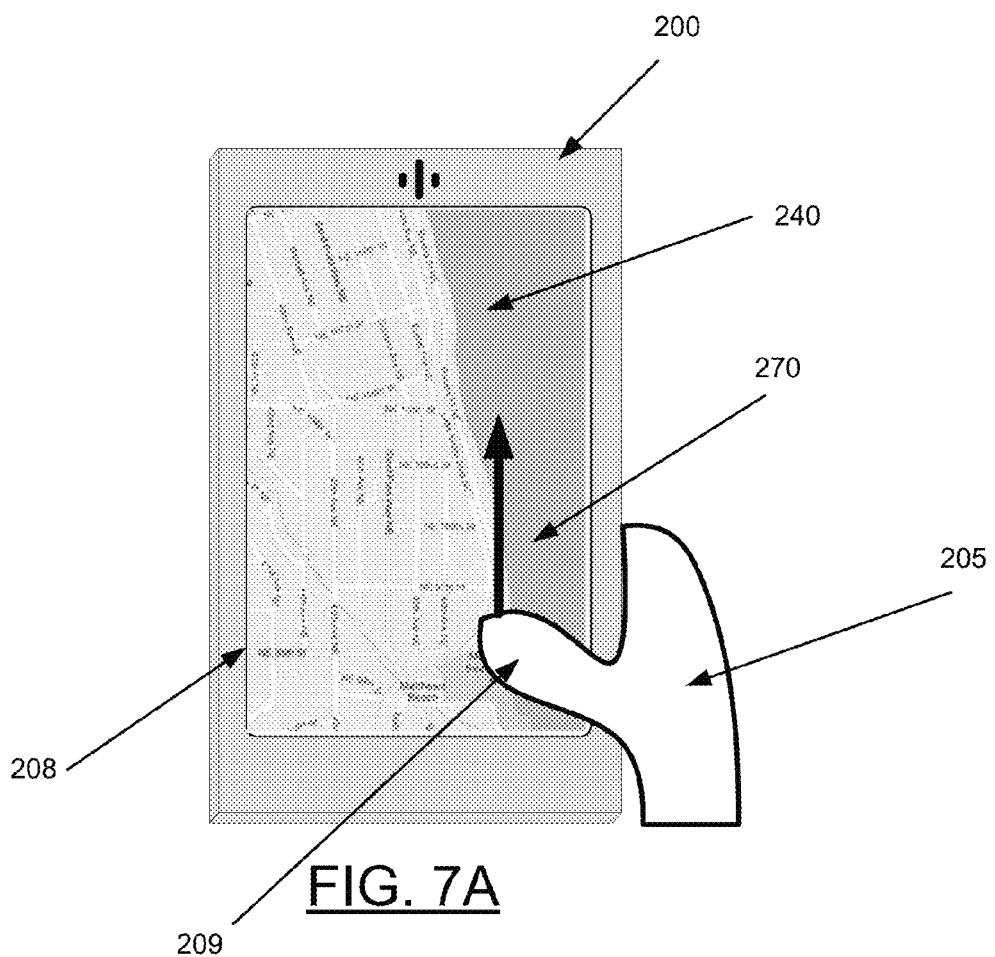
Figure 7B:
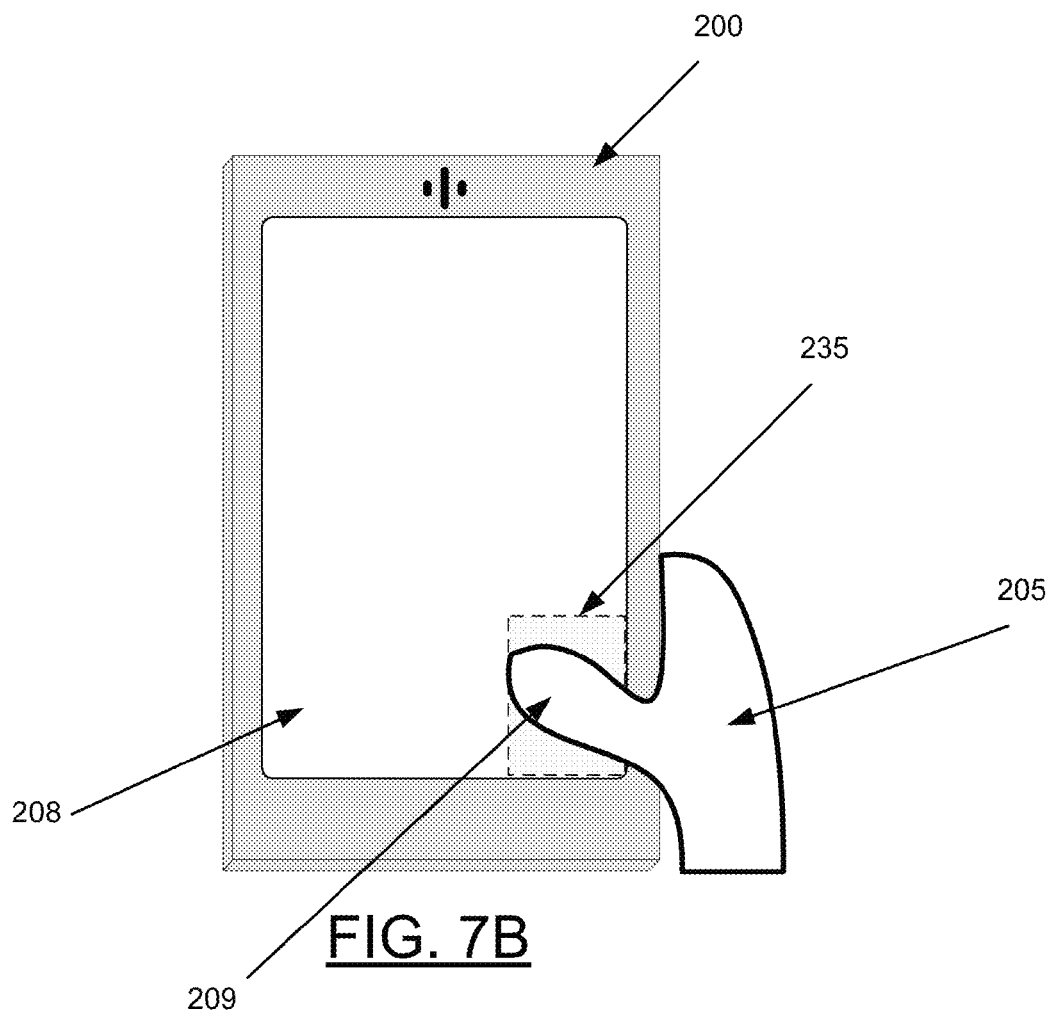
Figure 8A:
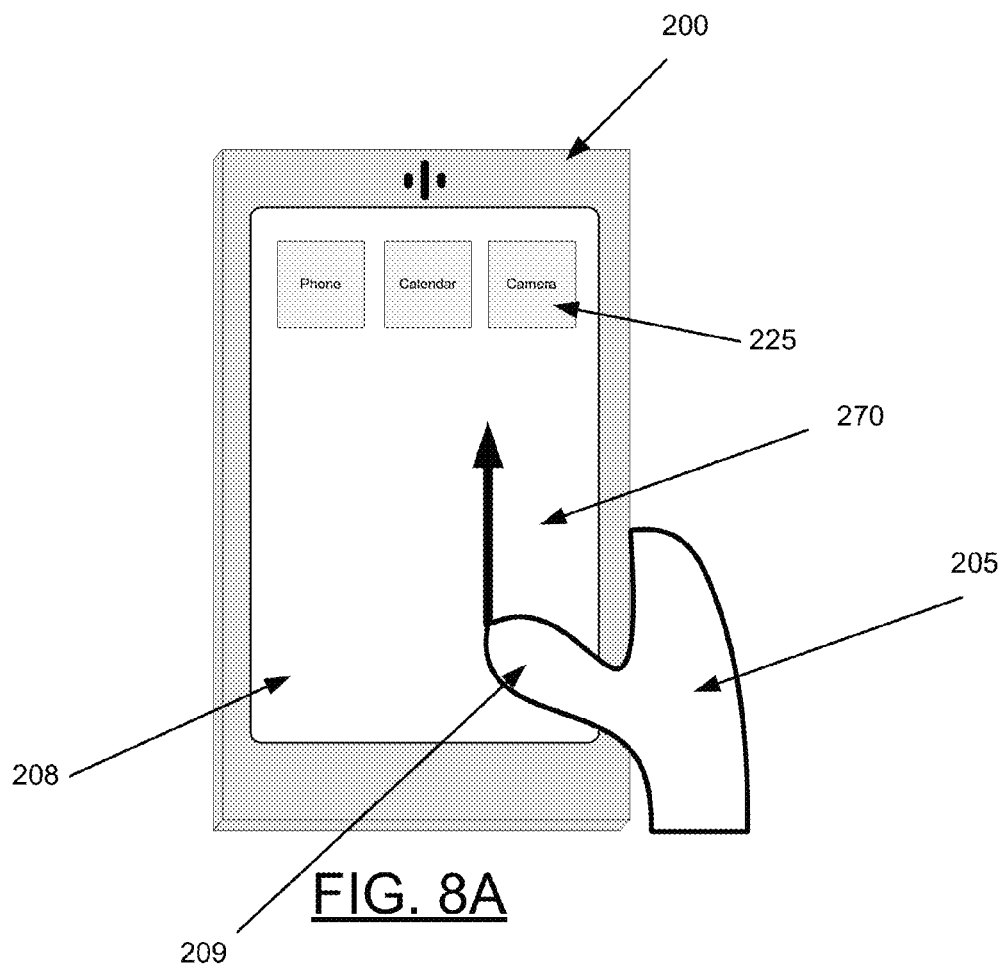
Figure 8B:
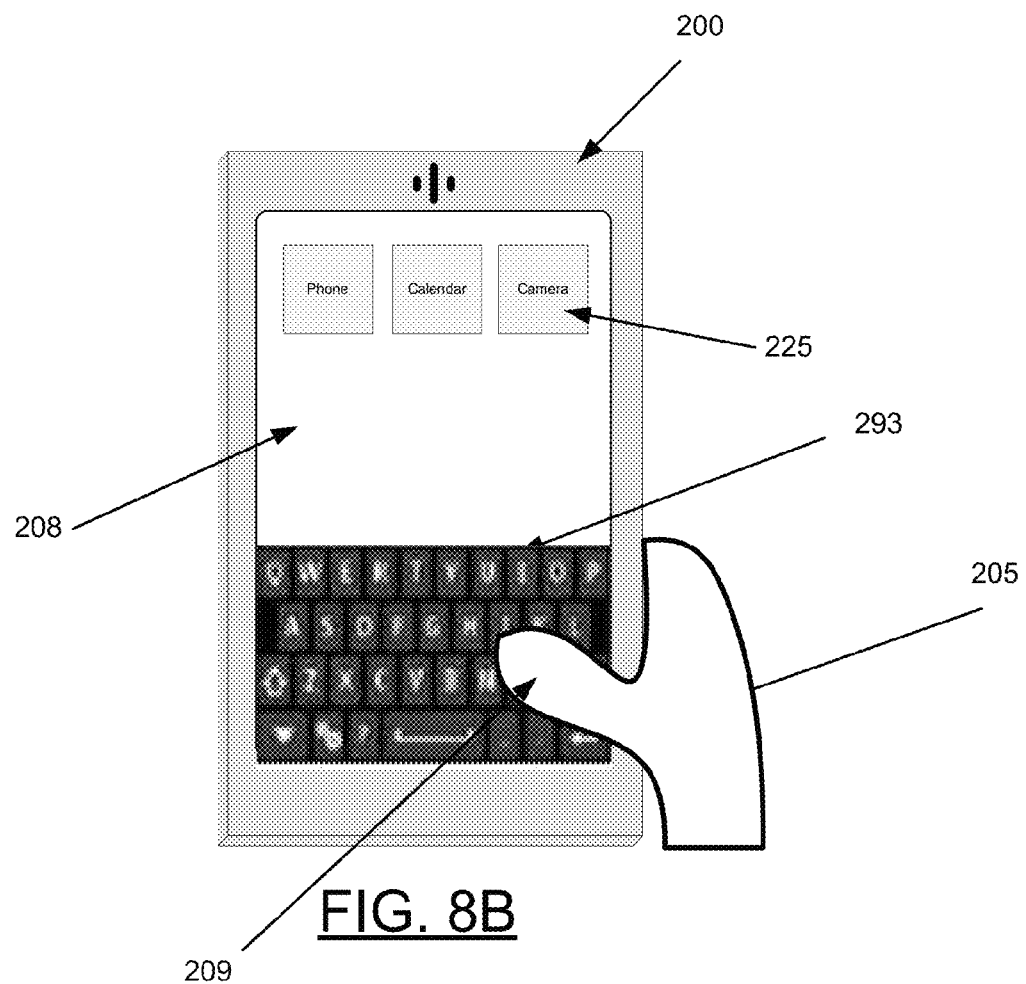
Figure 9A:
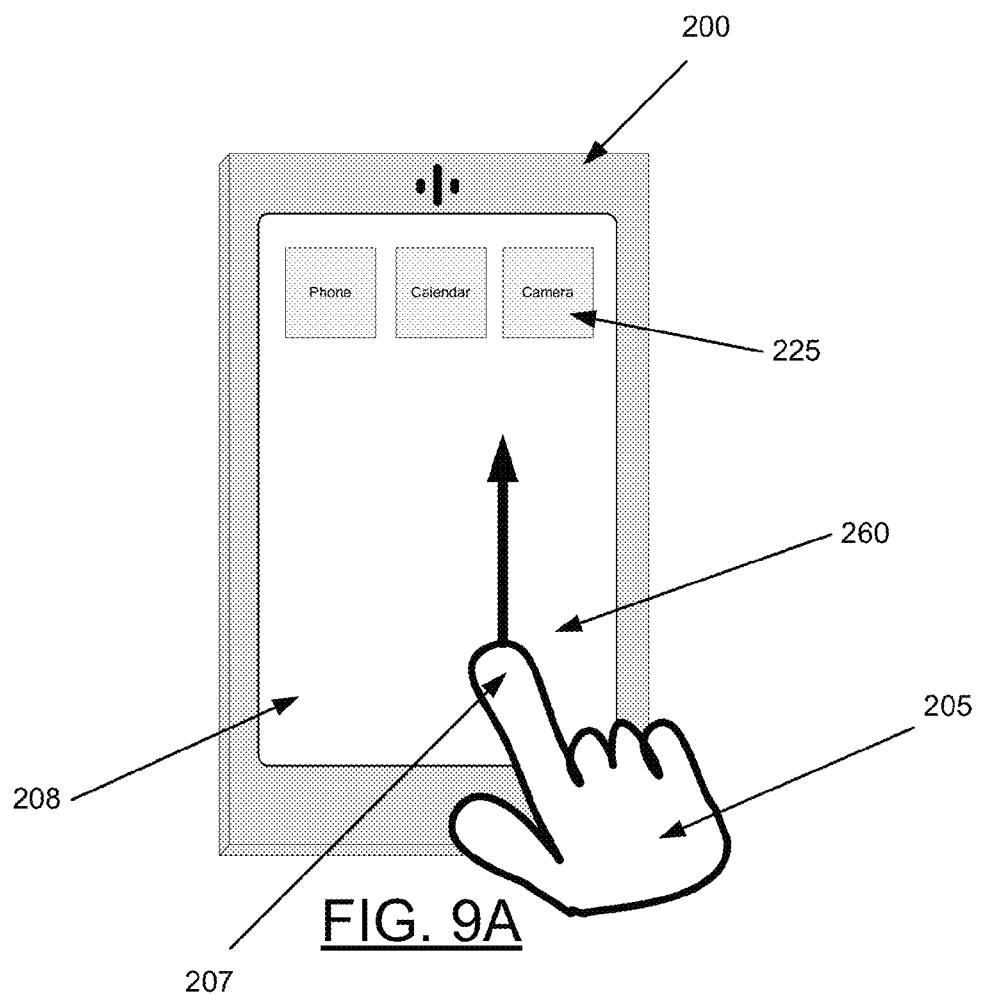
Figure 9B:
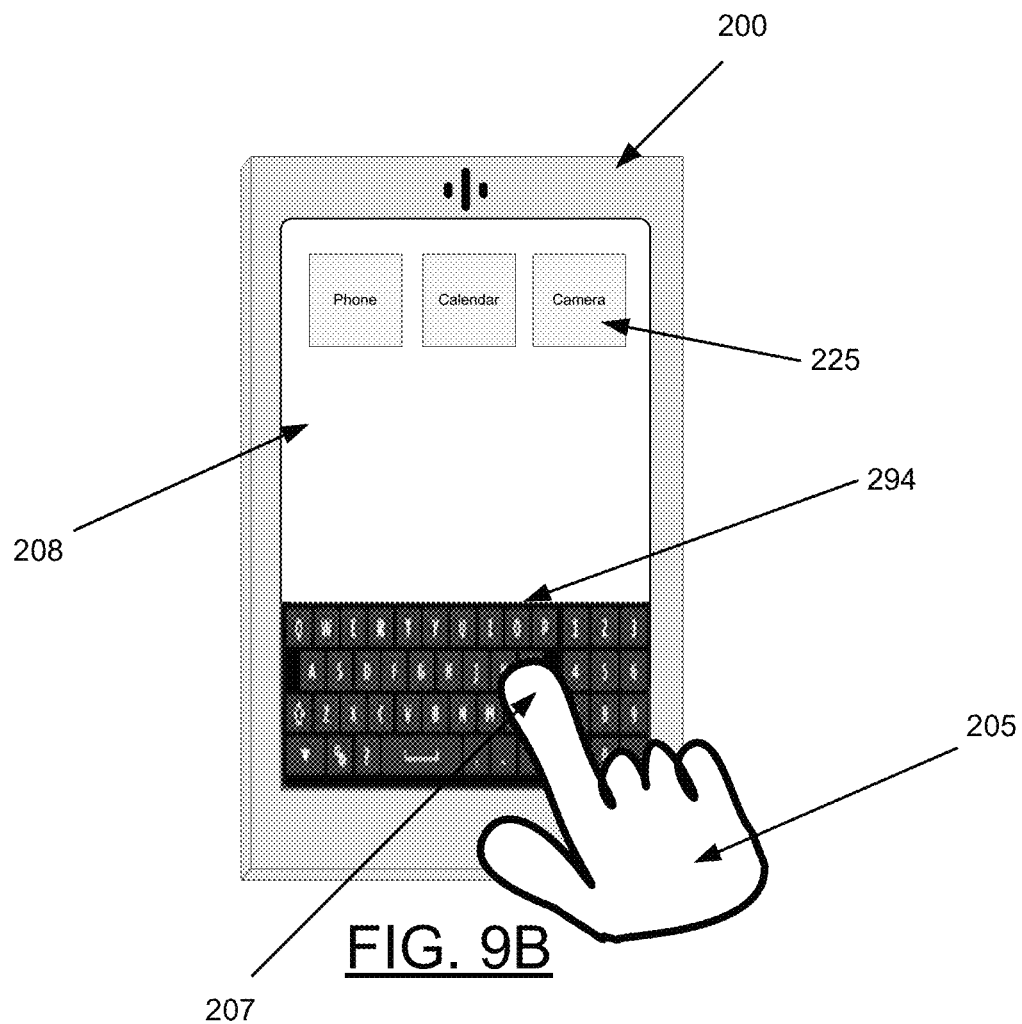
Figure 10:
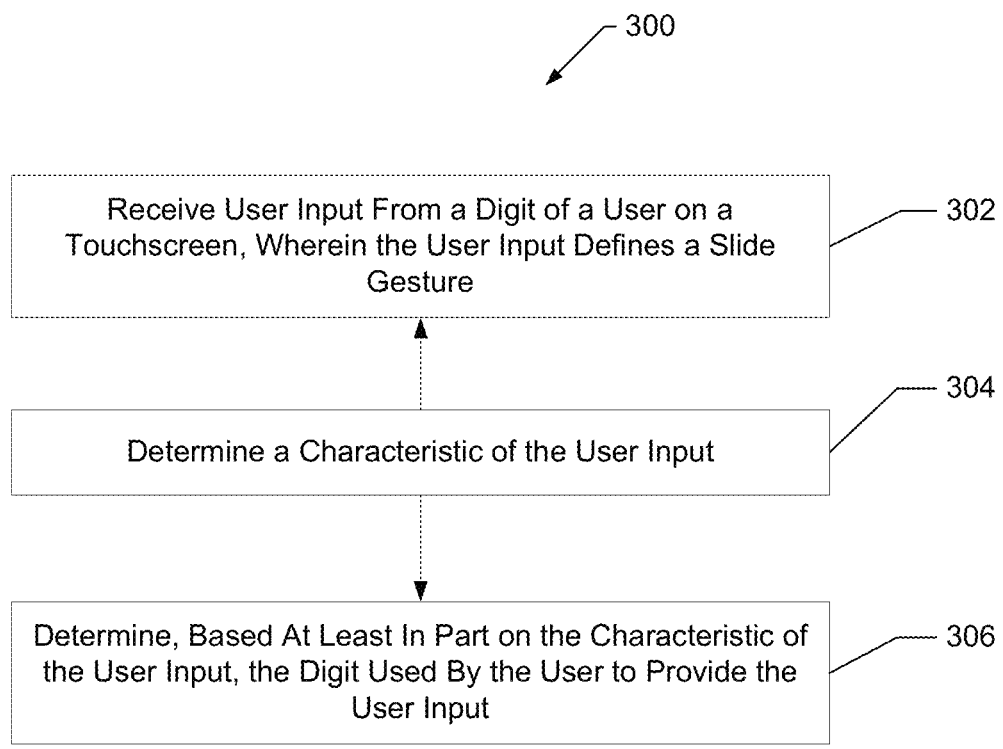
Figure 11:
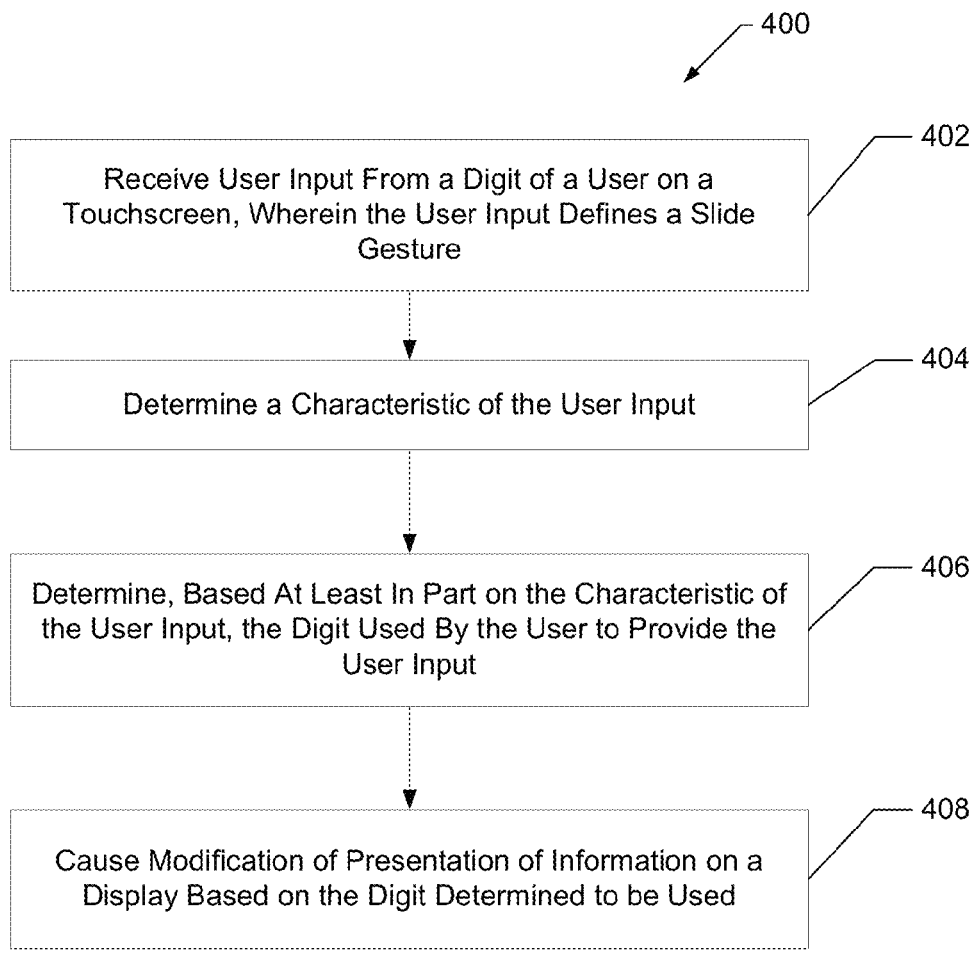

Having thus described some embodiments of the invention in general terms, reference will now be made to the accompanying drawings, which are not necessarily drawn to scale, and wherein:

FIG. 1 illustrates a block diagram of an apparatus according to an example embodiment of the present invention;

FIG. 2 is a schematic block diagram of a mobile terminal according to an example embodiment of the present invention;

FIGS. 3A and 3B illustrate example user inputs that may be received by an apparatus that may embody, for example, the apparatus shown in FIG. 1, in accordance with an example embodiment of the present invention described herein;

FIG. 4A illustrates an example apparatus, such as the apparatus shown in FIG. 1, with a user providing a slide gesture using their finger, in accordance with an example embodiment of the present invention described herein;

FIG. 4B illustrates an example apparatus, such as the apparatus shown in FIG. 1, with a user providing a slide gesture using their right thumb, in accordance with an example embodiment of the present invention described herein;

FIG. 4C illustrates an example apparatus, such as the apparatus shown in FIG. 1, with a user providing a slide gesture using their left thumb, in accordance with an example embodiment of the present invention described herein;

FIG. 5A illustrates representative traces of example slide gestures from a finger of a user, such as from the slide gesture shown in FIG. 4A, in accordance with an example embodiment of the present invention described herein;

FIG. 5B illustrates representative traces of example slide gestures from a right thumb of a user, such as from the slide gesture shown in FIG. 4B, in accordance with an example embodiment of the present invention described herein;

FIG. 5C illustrates representative traces of example slide gestures from a left thumb of a user, such as from the slide gesture shown in FIG. 4C, in accordance with an example embodiment of the present invention described herein;

FIG. 6A illustrates a user performing a slide gesture with their right thumb to an apparatus, such as the apparatus shown in FIG. 1, wherein icons are presented on a display of the apparatus, in accordance with an example embodiment of the present invention described herein;

FIG. 6B illustrates the apparatus shown in FIG. 6A, with a representation of a determined input area, in accordance with an example embodiment of the present invention described herein;

FIG. 6C illustrates the apparatus shown in FIG. 6B, wherein presentation of the icons on the display has been proportionately modified such that the icons are presented within the input area, in accordance with an example embodiment of the present invention described herein;

FIG. 6D illustrates the apparatus shown in FIG. 6B, wherein presentation of the icons on the display has been modified such that the icons are presented within the input area, in accordance with an example embodiment of the present invention described herein;

FIG. 7A illustrates a user performing a slide gesture with their right thumb to an apparatus, such as the apparatus shown in FIG. 1, wherein a portion of a map is presented on a display of the apparatus, in accordance with an example embodiment of the present invention described herein;

FIG. 7B illustrates the apparatus shown in FIG. 7A, with a representation of a determined obstruction area, in accordance with an example embodiment of the present invention described herein;

FIG. 7C illustrates the apparatus shown in FIG. 7B, wherein presentation of the map has been proportionately modified such that the portion of the map is not presented within the obstruction area, in accordance with an example embodiment of the present invention described herein;

FIG. 8A illustrates a user performing a slide gesture with their right thumb to an apparatus, such as the apparatus shown in FIG. 1, in accordance with an example embodiment of the present invention described herein;

FIG. 8B illustrates the apparatus shown in FIG. 8A, wherein a virtual keyboard configured for use with two thumbs has been presented on the display of the apparatus, in accordance with an example embodiment of the present invention described herein;

FIG. 9A illustrates a user performing a slide gesture with their finger to an apparatus, such as the apparatus shown in FIG. 1, in accordance with an example embodiment of the present invention described herein;

FIG. 9B illustrates the apparatus shown in FIG. 9A, wherein a virtual keyboard configured for use with ten digits has been presented on the display of the apparatus, in accordance with an example embodiment of the present invention described herein;

FIG. 10 illustrates a flowchart according to an example method for determination of the digit being used by a user to provide input, in accordance with an example embodiment of the present invention described herein; and FIG. 11 illustrates a flowchart according to another example method for determination of the digit being used by a user to provide input, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for determination of the digit being used by a user to provide input according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, tablet computer, e-book reader, smartphone, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, tablet computer, e-book reader, smartphone, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The sensor 118 may be in communication with the processor 110 and/or UI control circuitry 122. The sensor 118 may be configured to sense and/or detect input. Additionally, in some embodiments, the sensor 118 may be configured to detect or sense at least one characteristic of an input. For example, the sensor 118 may detect the degree of pressure used for an input. Additionally, the sensor 118 may be configured to provide output indicative of the characteristic to the apparatus 102 (e.g., the processor 110). In embodiments wherein the apparatus 102 is embodied as a mobile terminal 10, the sensor 118 may be embodied as or comprise the sensor 18 (shown in FIG. 2). In some embodiments, the processor 110 and/or UI control circuitry 122 may be configured to receive input from the sensor 118 and determine at least one characteristic of the input. In some embodiments, the sensor 118 may comprise at least one of a pressure sensor, a proximity sensor, a light sensor, an accelerometer, or a gyroscope.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102, such as through the user interface 116 or UI control circuitry 122, may be configured to receive input on a display (e.g., user interface 116). The user input may indicate a user's desire for the apparatus 102 to perform a designated function (e.g., run an application, load a website, scroll through a document, etc.). In some embodiments, the different components and/or features of the apparatus 102 may determine the types of functions able to be performed. Some examples of gestures are shown in FIGS. 3A and 3B.

FIG. 3A illustrates an example user input 250 for an apparatus 200 (e.g., apparatus 102) with a touch display 208 (e.g., user interface 116). In the depicted embodiment, a user 205 positions their finger 207 on or near the display, and particularly, on or near a portion 210 of the display. In some embodiments, the portion 210 of the display may correspond to a pre-determined point that is associated with a desired function. In other words, the portion 210 may correlate to a function that can be performed by the apparatus 200 (e.g., an icon representing an application). For example, the portion 210 may correlate to an application that grants access to the internet. Likewise, the portion 210 may correspond to another function, such as a hyperlink, game application, etc. Thus, by placing a finger 207 on or near the portion 210 (e.g., "touching"), the user 205 indicates a desire for the apparatus 200 to perform that related function (e.g., open the internet, access the linked website, launch the game application, etc.). Based on the user input detected, the apparatus 102 may respond, causing performance of the desired function.

FIG. 3B illustrates another example user input 255, often referred to as a "slide gesture", for an apparatus 200 (e.g., apparatus 102) with a touch display 208 (e.g., user interface 116). In the depicted embodiment, a user 205 positions a finger 207 on or near a portion of the display. The user 205 may slide their finger 207 along the display 208 (e.g., along arrow 215). In some embodiments, a user may slide their finger in a generally linear direction to define a slide gesture. This user input often corresponds to a user's desire to "scroll" or move the display to show displayed content that may be currently off the display. Based on the user input detected by the user interface 116, the processor 110 and/or UI control circuitry 122 may respond (e.g., scrolling the previously undisplayed content onto the display for the user). Though some example embodiments are shown herein with a slide gesture being performed in a vertical direction on a touchscreen, some embodiments of the present invention contemplate use of slide gestures performed in any direction on a touchscreen (e.g., downward, horizontal, at a 45° angle, etc.).

As indicated above, there are many types of user inputs that are recognizable by apparatus 102. Some additional known user inputs include pinching or reverse pinching for zooming out or zooming in, respectively. Also, as is consistent with some example embodiments described herein, a user may use other digits, such as their thumbs, to perform the input.

User input may be provided to an apparatus, such as apparatus 102, in a variety of different ways. Moreover, when an apparatus includes a touchscreen for user input, the user may practice a variety of different postures for interacting with the touchscreen. For example, a user may hold the apparatus in their left hand and use their right index finger to provide user input. Some of these postures may even limit the users' ability to interact (e.g., access or view) different features of the apparatus (e.g., application icons). For example, when holding an apparatus in one hand and using the same hand's thumb for providing user input, a user may not be able to access, or otherwise provide input to, features presented on a portion of the touchscreen certain distances away from the thumb being used for input. In other words, by holding the apparatus and using the thumb of the same hand, the distance the thumb may move to provide input may be less than the size of the touchscreen, thereby leaving a portion of the touchscreen that is not able to receive input. Additionally, in some cases, the thumb (or other finger) may obscure the user's view of the portion of the touchscreen it rests over.

As such, some embodiments of the present invention seek to determine the digit being used by the user to provide input. Once determination of the digit being used is made, in some embodiments, modifications to presentation of information may be applied to the apparatus to provide for an experience that is adapted for the specific digit being used.

In some embodiments, the apparatus 102, such as through the user interface 116 or UI control circuitry 122, may be configured to receive user input from a digit (e.g., a finger or thumb) of a user on a touchscreen (e.g., user interface 116). In some embodiments, such as shown in FIG. 3B, the user input may define a slide gesture. As noted above, a user may use any digit to provide user input to a touchscreen. For example, FIG. 4A illustrates a user 205 using their right index finger 207 to perform a slide gesture 260 on the touchscreen of the device 200. In some cases, as shown in FIG. 4B, the user 205 may use their right thumb 209 to perform a slide gesture 270 on the touchscreen of the device 200. Likewise, in some cases, as shown in FIG. 4C, the user 205 may use their left thumb 211 to perform a slide gesture 280 on the touchscreen of the device 200.

In the depicted embodiments of FIGS. 4B and 4C, the user 205 is holding the device 200 in their right hand or left hand, respectively, while providing user input 270, 280 to the device 200. Though some of the depicted embodiments are described with respect to user input from a thumb that occurs while the user is holding the apparatus in the same hand, use of any of the embodiments described herein with respect to user input from a thumb that occurs while the user is not holding the apparatus in the same hand is also contemplated.

In some embodiments, the apparatus 102, such as through the processor 110, may be configured to determine at least one characteristic of the user input. Indeed, each user input may be defined by at least one characteristic. Some example characteristics of a slide gesture may include the curvature of the user input, the start point and end point of the user input, the speed of the user input, and the length of the user input. The apparatus 102, such as through its components (e.g., UI control circuitry 122, processor 110, sensor 118, etc.), may be configured to detect or sense at least one of the characteristics of the input. Further, the components of the apparatus 102 may be configured to provide output representing the characteristic of the input to the apparatus 102 (e.g., the processor 110), such as for determination of the at least one characteristic of the input. Some example characteristics are described with respect to FIGS. 5A, 5B, and 5C which illustrate representative traces of example slide gestures, each being performed by different digits of a user.

FIG. 5A illustrates representative traces of example slide gestures performed by an index finger of a user on an apparatus (e.g., apparatus 102), such as the example slide gesture shown in FIG. 4A. As shown in FIG. 5A, traces 261 illustrate a number of similar inputs defining a slide gesture with a length $SL_{261}$ and a degree of curvature 269. In the depicted embodiment, the curvature 269 or traces 261 is relatively minimal (e.g., straight). Along these same lines, a slide gesture may have a start point and an end point that define the length. Likewise, traces 262, 263, 264, and 265 also have their own respective lengths, curvature, start point, and end point. For example, as illustrated in FIG. 5A, traces 265 have a length ($SL_{265}$) that is less than the length ($SL_{261}$) of traces 261.

FIG. 5B illustrates representative traces of example slide gestures performed by a right thumb of a user on an apparatus (e.g., apparatus 102), such as the example slide gesture shown in FIG. 4B. As shown in FIG. 5B, traces 271 illustrate a number of similar inputs defining a slide gesture with a length $SL_{271}$ and a degree of curvature 279. In the depicted embodiment, the degree of curvature 279 of traces 271 is pronounced and generally convex to the left (e.g., in the shape of a shallow "C"). Along these same lines, a slide gesture may have a start point and an end point that define the length. Likewise, traces 272, 273, 274, and 275 also have their own respective lengths, curvature, start point, and end point. For example, as illustrated in FIG. 5B, traces 275 have a length ($SL_{275}$) that is less than the length ($SL_{271}$) of traces 271. Similarly, the curvature 278 of traces 275 is less pronounced than the curvature 279 of traces 271.

FIG. 5C illustrates representative traces of example slide gestures performed by a left thumb of a user on an apparatus (e.g., apparatus 102), such as the example slide gesture shown in FIG. 4C. As shown in FIG. 5C, traces 281 illustrate a number of similar inputs defining a slide gesture with a length $SL_{281}$ and a degree of curvature 289. In the depicted embodiment, the degree of curvature 289 of traces 281 is pronounced and generally convex to the right (e.g., in the shape of a shallow, reverse "C"). Along these same lines, a slide gesture may have a start point and an end point that define the length. Likewise, traces 282, 283, 284, and 285 also have their own respective lengths, curvature, start point, and end point. For example, as illustrated in FIG. 5C, traces 285 have a length ($SL_{285}$) that is less than the length ($SL_{281}$) of traces 281. Similarly, the curvature 288 of traces 285 is less pronounced than the curvature 289 of traces 281.

In some embodiments, the apparatus 102, such as through the processor 110, may be configured to determine, based at least in part on the characteristic of the user input, the digit used by the user to provide the user input. Each user input may have different characteristics that help define it or differentiate it from other user input. Moreover, as shown in FIGS. 5A, 5B, and 5C, performance of the same user input (e.g., a slide gesture) by different digits of a user's hand may also have different characteristics (e.g., length, curvature, start and end point, etc.). As such, in some embodiments, the apparatus 102 may be configured to determine which of a right thumb, a left thumb, or another digit is used based on the determined characteristics of the user input.

As noted above, in some embodiments, the apparatus 102, such as through the processor 110, may be configured to determine the curvature of the user input. Additionally, in some embodiments, the apparatus 102, such as through the processor 110, may be configured to determine the digit used by the user to provide user input based on the curvature of the user input. For example, the curvature 269 (e.g., relatively straight) of the traces 261 of a slide gesture performed with a right index finger (shown in FIG. 5A) is different than the curvature 279 (e.g., convex to the left) of the traces 271 of a slide gesture performed with a right thumb (shown in FIG. 5B), which is also different than the curvature 289 (e.g., convex to the right) of the traces 281 of a slide gesture performed with a left thumb (shown in FIG. 5C). As such, in a circumstance where the apparatus 102 receives user input with a curvature that is similar to the curvature 279 of the traces 271 (e.g., the curvature is convex to the left), the apparatus 102 may determine that the user input was performed by a right thumb of the user. Along these same lines, if the curvature of the user input is determined to be relatively straight, the apparatus 102 may be configured to determine that the user input was performed by a finger other than a thumb (e.g., a right index finger).

In some embodiments, the apparatus 102, such as through the processor 110, User interface 116, UI control circuitry 122, or sensor 118, may be configured to detect the degree of curvature of the input and, in an instance in which the degree of curvature is greater than a pre-determined threshold curvature to the left, the apparatus 102 may be configured to determine that the digit used is a right thumb. Likewise, in some embodiments, in an instance in which the degree of curvature is greater than a pre-determined threshold curvature to the right, the apparatus 102 may be configured to determine that the digit used is a left thumb. Similarly, in some embodiments, in an instance in which the degree of curvature is less than a pre-determined threshold curvature to either the left or the right, the apparatus 102 may be configured to determine that the digit used is a finger (e.g., not a right thumb or a left thumb).

In some embodiments, the apparatus 102, may be configured to determine the digit being used based on additional characteristics of the user input. For example, in addition to determining the digit being used based on the curvature of the user input, the apparatus 102 may be configured to further determine the digit based on other characteristics, such as at least one of a start point and an end point of the user input, a speed of the user input, a length of the user input, a radius of an elliptical representation of the user input, an orientation of the elliptical representation of the user input, or an area of the elliptical representation of the user input. In such a manner, the apparatus 102, in some cases, may be configured to more accurately determine the digit being used. In some cases, the additional characteristics may provide further evidence of which digit is being used, therefore, providing a more robust determination of the digit being used to provide input.

Though the above example of determination of the digit used to perform the user input is described with respect to curvature of the user input, some embodiments of the present invention may use other characteristics (e.g., the start point and end point of the user input, the speed of the user input, and the length of the user input, among others) to determine the digit used. For example, the length of the user input may be indicative of the type of digit being used. Along these same lines, user input may, in some embodiments, be represented by an ellipse. In such cases, some embodiments of the present invention may use at least one characteristic of the ellipse (e.g., the radius, the orientation, the area, etc.) as a characteristic for determination of the digit used to perform the user input.

In addition to providing an indication of the type of digit used to perform user input, characteristics of user input may also provide an indication of other characteristics of the digit used to perform the user input. In some embodiments, based on at least one determined characteristic, the apparatus 102, such as through the processor 110, may be configured to determine a length of the digit used to provide the user input. For example, the length of the user input may provide an indication as to the length of the digit used to perform the user input. Indeed, a short thumb may not be able to reach as far on the touchscreen as a longer thumb. As such, the length of input of a slide gesture from the short thumb may likely be less than the length of input of a slide gesture from the longer thumb.

Though the above example of determination of the length of the digit used to perform the user input is described with respect to length of the user input, some embodiments of the present invention may use of other characteristics (e.g., the curvature of the user input, the start point and end point of the user input, and the speed of the user input, among others) to determine the length of the digit used. For example, the speed of the user input may be indicative of the length of digit being used.

In some embodiments, the apparatus 102, such as through the processor 110, may be configured to collect characteristics of multiple user input over a period of time. In such an embodiment, the apparatus 102 may be configured to determine, based on the collection of characteristics of multiple user inputs, the digit being used by the user. Such an embodiment may help provide a more accurate determination of the digit being used to perform the user input.

As noted above, use of a certain digit for providing user input may limit further use of certain features or limit the user's ability to provide input to some portions of the apparatus 102. As such, in some embodiments, the apparatus 102, such as through the processor 110, user interface 116, or UI control circuitry 122, may be configured to cause modifications to presentation of information in order to adapt the presentation for optimal use with the specific digit being used. As such, in some embodiments, the apparatus 102 may be configured to cause modification of presentation of information on a display based on the digit determined to be used.

In some embodiments, the apparatus 102, such as through the processor 110, user interface 116, or UI control circuitry 122, may be configured to modify presentation of information such that the information is more easily accessible to the digit determined to be used by the user. For example, a digit of a user, such as due to its length or position, may be limited to an area (e.g., an input area) in which input can be applied to the apparatus 102.

In some embodiments, the apparatus 102, such as through the processor 110, may be configured to define, based at least in part on the characteristic of the user input, at least one of a size or a position of an input area. The size and/or position of the input area may be determined based on at least one characteristic of previous input that has been provided and/or the determination of the type or length of the digit being used to perform the input. For example, as noted above, the apparatus 102 may be configured to determine at least one of the position of the input, the start point and end point of the input, the length of the digit used by the user, the length of the input, or the type of digit used by the user. Based on this, the apparatus 102 may be configured to determine an input area. For example, with reference to FIG. 6A, a user 205 may provide input (e.g., perform slide gesture 270) with their right thumb 209 to a touchscreen of a device 200. The device 200, such as described in some embodiments herein, may determine that the user is using their right thumb to perform the input. Additionally, in some embodiments, with reference to FIG. 6B, the device 200 may determine an input area 230 that corresponds to the area in which the right thumb 209 of the user 205 may be able to provide input. For example, the user's right thumb 209 may be able to stretch up to the boundaries of the input area 230, but may not be able to stretch beyond, such as may be needed to provide input to, for example, icon 225.

Though a rectangular input area 230 is shown in FIG. 6B, some embodiments of the present invention contemplate determination of any shape of input area (e.g., semi-circle, square, etc.).

In some embodiments, the apparatus 102, such as through the processor 110, user interface 116, or UI control circuitry 122, may be configured to cause modification of presentation of information on the display such that the information is positioned within the input area. In such a manner, the information (e.g., an icon for accessing an application) may be accessible to the user's digit that is performing the input. For example, with reference to FIGS. 6B and 6C, a Phone application icon 227, a Calendar application icon 226, and a Camera application icon 225 (shown in FIG. 6B) have been proportionality resized and positioned within the input area 230 (shown in FIG. 6C). As such, the user's right thumb 209 may now easily reach and provide input to the Phone application icon 227', Calendar application icon 226', and Camera application icon 225'.

Likewise, though FIG. 6C illustrates a proportional modification to the presentation of information, other modifications are contemplated by some embodiments of the present invention. For example, with reference to FIGS. 6B and 6D, a Phone application icon 227, a Calendar application icon 226, and a Camera application icon 225 (shown in FIG. 6B) have been repositioned within the input area 230 (shown in FIG. 6D) without being resized. As such, the user's right thumb 209 may now easily reach and provide input to the Phone application icon 227", Calendar application icon 226", and Camera application icon 225".

As noted above, in some cases, depending on what digit the user is using and how the user is holding the apparatus, the digit may actually obstruct the user's view of some of the information being presented on the display of the apparatus. Thus, in some embodiments, the apparatus 102, such as through the processor 110, user interface 116, or UI control circuitry 122, may be configured to cause modification of presentation of information on the display such that the information is positioned outside of an area (e.g., an obstruction area) of the display obstructed by the digit determined to be used. The size and/or position of the obstruction area may be determined based on at least one characteristic of previous input that has been provided and/or the determination of the type or length of the digit being used to perform the input. For example, as noted above, the apparatus 102 may be configured to determine at least one of the position of the input, the start point and end point of the input, the length of the digit used by the user, the length of the input, or the type of digit used by the user. Based on this, the apparatus 102 may be configured to determine an obstruction area. For example, with reference to FIG. 7A, a user 205 may provide input (e.g., perform slide gesture 270) with their right thumb 209 to a touchscreen of a device 200. The device 200, such as described in some embodiments herein, may determine that the user is using their right thumb to perform the input. Additionally, in some embodiments, with reference to FIG. 7B, the device 200 may determine an obstruction area 235 that corresponds to the area in which the right thumb 209 of the user 205 obstructs the user's view of the display. For example, the user's right thumb 209 may be positioned at a resting state over a portion of the display (e.g., the obstruction area).

Though a rectangular obstruction area 235 is shown in FIG. 7B, some embodiments of the present invention contemplate determination of any shape of an obstruction area (e.g., semi-circle, square, etc.).

In some embodiments, the apparatus 102, such as through the processor 110, user interface 116, or UI control circuitry 122, may be configured to cause modification of presentation of information on the display such that the information is positioned outside of the obstruction area. In such a manner, the information (e.g., a map 240) may be fully viewable to the user. For example, with reference to FIGS. 7A and 7C, a map 240 (shown in FIG. 7A) has been proportionality resized and repositioned outside of the obstruction area 235 (shown in FIG. 7C). As such, the user may view the entire map 240' without the user's right thumb 209 covering any portion of it. Though FIG. 7C illustrates a proportional modification to the presentation of information, other modifications are contemplated by some embodiments of the presentation invention.

In some embodiments, the apparatus 102, such as through the processor 110, user interface 116, or UI control circuitry 122, may be configured to cause presentation of a keyboard on the display based on the digit determined to be used. In some embodiments, a first keyboard may be presented in an instance in which a thumb is determined to be used. Such a first keyboard may be designed for use with a thumb or two thumbs of a user (e.g., a two-digit keyboard). For example, with reference to FIGS. 8A and 8B, in response to a user 205 providing input (e.g., slide gesture 270) with their right thumb 209 (shown in FIG. 8A), the device 200 may determine that the user's right thumb is being used to provide input. As such, with reference to FIG. 8B, the device 200 may cause presentation of a two-digit virtual keyboard 293 when the user indicates that they wish to enter input using a virtual keyboard. Along these same lines, other types of virtual keyboards that are designed for use with a thumb may be presented. For example, the virtual keys on the first keyboard may be scaled in proportion to the increased size of the thumb of a user (e.g., the virtual keys may be larger than normal when a thumb is determined to be used to provide input).

In some embodiments, the apparatus 102, such as through the processor 110, user interface 116, or UI control circuitry 122, may be configured to present a second keyboard in an instance in which a finger (e.g., an index finger) is determined to be used to provide input. The second keyboard, in some cases, may be a ten-digit keyboard that is designed for use by ten digits of a user. For example, with reference to FIGS. 9A and 9B, in response to a user 205 providing input (e.g., slide gesture 260) with their index finger 207 (shown in FIG. 9A), the device 200 may determine that the user's finger is being used to provide input. As such, with reference to FIG. 9B, the device 200 may cause presentation of a ten-digit virtual keyboard 294 when the user indicates that they wish to enter input using a virtual keyboard. Along these same lines, other types of keyboards that are designed for use with a finger of a user may be presented. For example, the virtual keys of the second keyboard for a finger may be smaller, allowing for more keys to be presented on the virtual keyboard. In some cases, the smaller virtual keys may be sized in proportion to the size of the finger determined to be used to provide user input.

Although the above described embodiments involve causing presentation of virtual keyboards designed for use with a determined digit, other user interface features may be modified based on the digit determined to be used (e.g., icons, input features for media playing, etc.).

Embodiments of the present invention provide methods, apparatus and computer program products for determination of the digit being used by a user to provide input. Various examples of the operations performed in accordance with embodiments of the present invention will now be provided with reference to FIGS. 10-11.

FIG. 10 illustrates a flowchart according to an example method for determination of the digit being used by a user to provide input according to an example embodiment 300. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 302 may comprise receiving user input from a digit of a user on a touchscreen, wherein the user input defines a slide gesture. The processor 110, user interface 116, sensor 118, and/or UI control circuitry 122 may, for example, provide means for performing operation 302. Operation 304 may comprise determining a characteristic of the user input. The processor 110, user interface 116, sensor 118, and/or UI control circuitry 122 may, for example, provide means for performing operation 304. Operation 306 may comprise determining, based at least in part on the characteristic of the user input, the digit being used by the user to provide the user input. The processor 110 may, for example, provide means for performing operation 306.

FIG. 11 illustrates a flowchart according to an example method for determination of the digit being used by a user to provide input according to an example embodiment 400. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 402 may comprise receiving user input from a digit of a user on a touchscreen, wherein the user input defines a slide gesture. The processor 110, user interface 116, sensor 118, and/or UI control circuitry 122 may, for example, provide means for performing operation 402. Operation 404 may comprise determining a characteristic of the user input. The processor 110, user interface 116, sensor 118, and/or UI control circuitry 122 may, for example, provide means for performing operation 404. Operation 406 may comprise determining, based at least in part on the characteristic of the user input, the digit being used by the user to provide the user input. The processor 110 may, for example, provide means for performing operation 406. Operation 408 may comprise causing modification to presentation of information on a display based on the digit determined to be used. The processor 110, user interface 116, sensor 118, and/or UI control circuitry 122 may, for example, provide means for performing operation 408.

FIGS. 10-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
receiving user input from a digit of a user on a touchscreen, wherein the user input defines a slide gesture;
determining a characteristic of the user input; and
determining, by a processor, based at least in part on the characteristic of the user input, the digit used by the user to provide the user input;
determining a length of the digit used to provide the user input;
determining, based at least on the determined digit and the length of the digit, a size and a position of an obstruction area, wherein the obstruction area defines an area of the touchscreen where the digit obstructs the view of the user; and
causing modification of presentation of information on the touchscreen such that the information is positioned outside of the obstruction area.

2. The method according to claim 1, wherein determining the digit comprises determining which of a right thumb, a left thumb, or another digit is used to perform the user input.

3. The method according to claim 1, wherein determining the characteristic of the user input comprises determining a curvature of the user input.

4. The method according to claim 3, wherein determining the characteristic of the user input comprises further determining at least one of a start point and an end point of the user input, a speed of the user input, a length of the user input, a radius of an elliptical representation of the user input, an orientation of the elliptical representation of the user input, or an area of the elliptical representation of the user input.

5. The method according to claim 1, wherein determining the characteristic of the user input comprises determining the characteristic based on output from at least one of an accelerometer, a gyroscope, or a pressure sensor.

6. The method according to claim 1 further comprising defining, based at least in part on the determined digit and the length of the digit a size and a position of an input area, wherein causing modification of presentation of information comprises causing modification of presentation of information on the display such that input-receptive information is positioned within the input area.

7. The method according to claim 1 further comprising causing presentation of a keyboard on a display based on the digit determined to be used, wherein a first keyboard is presented in an instance in which a thumb is determined to be used, and wherein a second keyboard is presented in an instance in which another digit is determined to be used.

8. An apparatus comprising at least one processor and at least one memory including computer program code, the memory and the computer program code configured to, with the at least one processor, cause the apparatus to:
receive user input from a digit of a user on a touchscreen, wherein the user input defines a slide gesture;
determine a characteristic of the user input; and
determine, based at least in part on the characteristic of the user input, the digit used by the user to provide the user input;
determine a length of the digit used to provide the user input;
determine, based at least on the determined digit and the length of the digit, a size and a position of an obstruction area, wherein the obstruction area defines an area of the touchscreen where the digit obstructs the view of the user; and
cause modification of presentation of information on the touchscreen such that the information is positioned outside of the obstruction area.

9. The apparatus of claim 8, wherein the at least one memory and the computer program code are further configured to, with the at least one processor, cause the apparatus to determine the digit by determining which of a right thumb, a left thumb, or another digit is used to perform the user input.

10. The apparatus of claim 8, wherein the at least one memory and the computer program code are further configured to, with the at least one processor, cause the apparatus to determine the characteristic of the user input by determining a curvature of the user input.

11. The apparatus of claim 10, wherein the at least one memory and the computer program code are further configured to, with the at least one processor, cause the apparatus to determine the characteristic of the user input by further determining at least one of a start point and an end point of the user input, a speed of the user input, a length of the user input, a radius of an elliptical representation of the user input, an orientation of the elliptical representation of the user input, or an area of the elliptical representation of the user input.

12. The apparatus of claim 8, wherein the at least one memory and the computer program code are further configured to, with the at least one processor, cause the apparatus to determine the characteristic of the user input by determining the characteristic based on output from at least one of an accelerometer, a gyroscope, or a pressure sensor.

13. The apparatus of claim 8, wherein the at least one memory and the computer program code are further configured to, with the at least one processor, cause the apparatus to define, based at least in part on the determined digit and the length of the digit a size and a position of an input area, and wherein the at least one memory and the computer program code are further configured to, with the at least one processor, cause the apparatus to cause modification of presentation of information by causing modification of presentation of information on the display such that input-receptive information is positioned within the input area.

14. The apparatus of claim 8, wherein the at least one memory and the computer program code are further configured to, with the at least one processor, cause the apparatus to cause presentation of a keyboard on a display based on the digit determined to be used, wherein a first keyboard is presented in an instance in which a thumb is determined to be used, and wherein a second keyboard is presented in an instance in which another digit is determined to be used.

15. Computer program product comprising a non-transitory computer readable medium having program code portions stored thereon, the program code portions being configured when said program product is run on a computer or network device, to:
receive user input from a digit of a user on a touchscreen, wherein the user input defines a slide gesture;
determine a characteristic of the user input; and
determine, based at least in part on the characteristic of the user input, the digit used by the user to provide the user input
determine a length of the digit used to provide the user input;
determine, based at least on the determined digit and the length of the digit, a size and a position of an obstruction area, wherein the obstruction area defines an area of the touchscreen where the digit obstructs the view of the user; and
cause modification of presentation of information on the touchscreen such that the information is positioned outside of the obstruction area.

16. The computer program product of claim 15, wherein the program code portions are further configured to:
define, based at least in part on the determined digit and the length of the digit a size and a position of an input area, and
cause modification of presentation of information by causing modification of presentation of information on the display such that input-receptive information is positioned within the input area.

* * * * *